United States Patent [19]

Asano

[11] Patent Number: 5,562,929
[45] Date of Patent: Oct. 8, 1996

[54] APPARATUS FOR OPTICALLY SHAPING PHOTO-SETTING RESIN

[75] Inventor: Junichi Asano, Tokyo, Japan

[73] Assignee: Sony Corporation, Tokyo, Japan

[21] Appl. No.: 475,764

[22] Filed: Jun. 7, 1995

Related U.S. Application Data

[62] Division of Ser. No. 180,318, Jan. 12, 1994.

[30] Foreign Application Priority Data

Jan. 12, 1993 [JP] Japan ..................... 5-003203

[51] Int. Cl.$^6$ .................................... B29C 35/08
[52] U.S. Cl. .................. 425/174.4; 264/401; 359/197; 364/474.24; 395/120; 425/150
[58] Field of Search .................. 425/174.4, 174, 425/140, 150; 264/401; 364/474.22–474.27, 476, 468; 359/197, 198; 430/269, 270, 320, 331; 395/119, 120, 125

[56] References Cited

U.S. PATENT DOCUMENTS

| | | | |
|---|---|---|---|
| 4,961,154 | 10/1990 | Pomerantz et al. | 395/119 |
| 5,058,988 | 10/1991 | Spence | 425/174.4 X |
| 5,071,337 | 12/1991 | Heller et al. | 425/174.4 |
| 5,151,813 | 9/1992 | Yamamoto et al. | 264/401 X |
| 5,253,177 | 10/1993 | Saito et al. | 364/468 |
| 5,415,820 | 5/1995 | Furuta et al. | 264/401 |
| 5,460,758 | 10/1995 | Langer et al. | 364/476 X |

FOREIGN PATENT DOCUMENTS

| | | |
|---|---|---|
| 0388129 | 9/1990 | European Pat. Off. . |
| 0406513 | 1/1991 | European Pat. Off. . |
| 0484183 | 5/1992 | European Pat. Off. . |

*Primary Examiner*—Richard L. Chiesa
*Attorney, Agent, or Firm*—Hill, Steadman & Simpson

[57] ABSTRACT

A photo-setting resin is shaped into a three-dimensional resin model by scanning successive resin solution layers of a photo-setting resin solution with a radiation beam to form a stack of scanned set layers of photo-setting resin, each of the successive resin solution layers having a shaped region of an isometric section. The radiation beam is scanned along a contour line of the shaped region to set the shaped region along the contour line, and scanned in a raster scanning mode to set the shaped region inwardly of the contour line. Specifically, the radiation beam is scanned along a first line which is spaced a first distance inwardly from the contour line thereby to set the shaped region along the first line, and the radiation beam is scanned inwardly of a second line which is spaced a second distance inwardly from the contour line thereby to set the shaped region inwardly of the second line. The first distance is smaller than the second distance.

3 Claims, 8 Drawing Sheets

F I G. 10
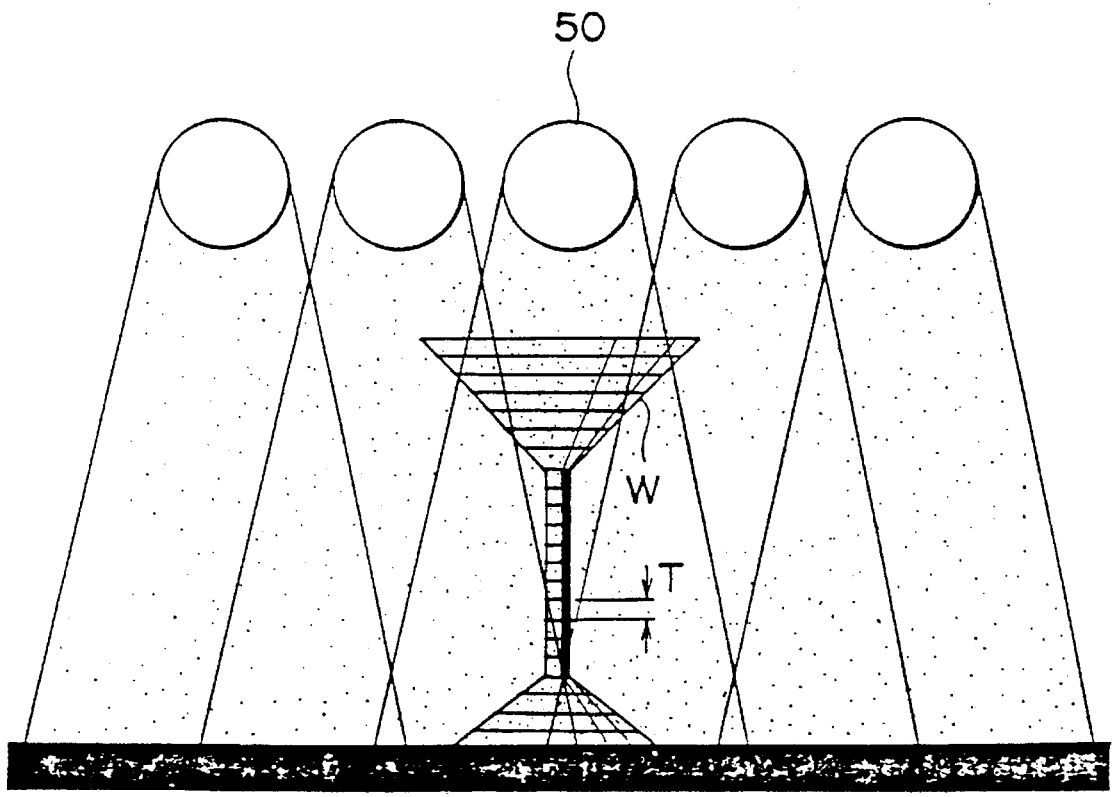

APPARATUS FOR OPTICALLY SHAPING PHOTO-SETTING RESIN

This is a division of application Ser. No. 08/180,318, filed Jan. 12, 1994.

BACKGROUND OF THE INVENTION

1. Field of the Invention

The present invention relates to a method of and an apparatus for optically shaping a photo-setting resin such as an ultraviolet-curing resin into a desired resin model by applying a light beam to the photo-setting resin and scanning the same with the applied light beam, and more particularly to a method of and an apparatus for optically shaping, with high accuracy, a closed region of a photo-setting resin which is surrounded by a contour line.

2. Description of the Related Art

Attempts have heretofore been made to scan the surface of an ultraviolet-curing resin solution stored in a tank with an ultraviolet laser beam while turning on and off the ultraviolet laser beam thereby producing a scanned set layer of ultraviolet-curing resin, and successively stacking such scanned set layers into a three-dimensional desired resin model. Such a resin model is typically used as a master model for fabricating products. Therefore, it is necessary to increase the accuracy with which the ultraviolet-curing resin is shaped, the bonding strength between adjacent scanned set layers, and the efficiency with which the ultra-violet curing resin is shaped.

According to one optical shaping process, an ultra-violet laser beam is generated by an ultraviolet laser oscillator, turned on and off and scanned under the control of an optical system which has a galvanometer mirror and a shutter, and applied to the surface of an ultraviolet-curing resin solution stored in a tank. The tank accommodates therein a vertically movable elevator which can block the ultraviolet laser beam. A resin solution layer that is interposed between the surface of the ultraviolet-curing resin solution and the elevator is set by the ultraviolet laser beam applied thereto.

In the optical shaping process, the elevator is in a lifted position, and, a resin solution layer that is present between the surface of the ultraviolet-curing resin solution and the elevator is set by the ultraviolet laser beam applied thereto, thereby forming a first scanned set layer. Then, the elevator is lowered a distance corresponding to the first scanned set layer, and the scanning ultraviolet laser beam is applied to form a second scanned set layer over the first scanned set layer. Subsequently, scanned set layers are successively formed downwardly until a final scanned set layer is formed. After the final scanned set layer is formed, the elevator is lifted to remove a desired resin model, which is composed of the stack of scanned set layers thus produced, out of the resin solution. To finally set the resin model, the resin model, designated by W in FIG. 10 of the accompanying drawings, is irradiated with an ultraviolet radiation emitted from an ultraviolet lamp 50 for a long period of time.

A horizontal plane in the ultraviolet-curing resin solution within each vertical distance that the elevator traverses on its vertical movement is hereinafter referred to as an isometric section. One isometric section contains a region (a set region) where the resin solution is to be set and a region (an unset region) where the resin solution is not to be set, depending on the three-dimensional shape of the resin model W to be fabricated.

The ultraviolet laser beam generated by the ultra-violet laser oscillator is scanned along a scanning line over the resin solution layer in each isometric section by the optical system. The ultraviolet laser beam is turned on, i.e., a shutter (AOM) is open, within the set region, and is turned off, i.e., the shutter (AOM) is closed, within the unset region. When the scanning along one scanning line is over, the ultraviolet laser beam is shifted a scanning pitch, and then scanned along a next scanning line over the resin solution layer.

When the ultraviolet laser beam is applied to the ultraviolet-curing resin solution, the radiation energy thereof is progressively reduced as it enters the ultraviolet-curing resin solution. Therefore, from a microscopic viewpoint, the region of the ultraviolet-curing resin solution which is irradiated with the ultraviolet laser beam, i.e., the scanned set layer, contains sharp lower edges of set resin.

To form a stack of successive scanned set layers of ultraviolet-curing, resin, an upper scanned set layer is produced by an ultraviolet laser beam whose radiation energy is strong enough to irradiate a lower resin solution layer, so that the depth to which the resin solution is set across the upper-layer isometric section is greater than the actual thickness of the upper scanned set layer. In this manner, the successive scanned set layers of ultraviolet-curing resin are joined together with a large bonding strength.

If the scanned set layer in one isometric section is of a closed region enclosed by a contour line as shown in FIG. 11 of the accompanying drawings, then it is formed according to the conventional optical shaping process as follows: First, a contour line OL shown in FIG. 11 is recognized. Then, as shown in FIG. 12 of the accompanying drawings, the resin solution layer is scanned along a scanning line parallel to one edge OL1 of the contour from a start-of-scan point P0 to an end-of-scan point P1. Thereafter, the optical system is controlled to shift the scanning ultraviolet laser beam by a scanning pitch, and then the resin solution layer is scanned along a next scanning line from a start-of-scan point P2.

Such a scanning mode is referred to as a raster scanning mode. In the conventional optical shaping process which employs the raster scanning mode, the ultraviolet laser beam is applied as a circular beam spot to the ultraviolet-curing resin solution. Therefore, as shown in FIG. 12, the scanned set layer is not shaped exactly along the contour line at edges OL2, OL3 where the scanning lines start and end. Consequently, the conventional optical shaping process suffers problems in the production of highly accurate resin models.

To produce a three-dimensional resin model highly accurately according to the conventional optical shaping process, it is necessary to reduce the diameter of the ultraviolet laser beam spot and also to reduce the scanning pitch. However, reducing the spot diameter and the scanning pit results in an increase in the time required to produce the resin model or requires stricter beam position control at the start-of-scan and end-of-scan points.

SUMMARY OF THE INVENTION

It is an object of the present invention to provide a method of and an apparatus for optically shaping a photo-setting resin highly accurately in a closed region enclosed by a contour line.

According to the present invention, there is provided a method of optically shaping a photo-setting resin into a three-dimensional resin model by scanning successive resin solution layers of a photo-setting resin solution with a radiation beam to form a stack of scanned set layers of photo-setting resin, each of the successive resin solution layers having a shaped region of an isometric section, the method comprising the steps of scanning the radiation beam along a contour line of the shaped region to set the shaped region along the contour line, and scanning the radiation beam in a raster scanning mode to set the shaped region inwardly of the contour line. The radiation beam may be scanned along a line which is spaced a distance (r1) inwardly from the contour line.

Alternatively, the radiation beam may be scanned along a first line which is spaced a first distance inwardly from the contour line thereby to set the shaped region along the first line, and the radiation beam may be scanned inwardly of a second line which is spaced a second distance (r2) inwardly from the contour line thereby to set the shaped region inwardly of the second line.

According to the present invention, there is also provided an apparatus for optically shaping a photo-setting resin into a three-dimensional resin model, comprising a tank containing a photo-setting resin solution, optical scanner means for generating and scanning a radiation beam including a wavelength suitable for photo-setting the photo-setting resin solution over the photo-setting resin solution to produce a scanned set layer therein, elevator means for vertically moving the scanned set layer produced when the photo-setting resin solution is scanned by the radiation beam, and control means for controlling the optical scanner means and the elevator means, the control means comprising a three-dimensional shape information memory for storing at least part of three-dimensional shape information of the three-dimensional resin model to be formed, a scanned set layer information extractor for extracting information relative to a scanned set layer which is to be formed by the radiation beam without actuating the elevator means, from the three-dimensional shape information stored in the three-dimensional shape information memory, a contour line detector for detecting a contour line of the scanned set region based on the information extracted by the scanned set layer information extractor, a contour set information extractor for calculating, as path information, a line which is spaced a first distance inwardly from the contour line detected by the contour line detector, an inside region information extractor for extracting a closed region inwardly of a line which is spaced a second distance inwardly from the contour line detected by the contour line detector, and means for controlling the optical scanner means to scan the scanned set layer with the radiation beam based on the path information calculated by the contour set information extractor and the closed region extracted by the inside region information extractor.

The control means may comprise means for controlling the optical scanner means to scan the scanned set layer with the radiation beam in a vector scanning mode based on the path information calculated by the contour set information extractor and in a raster scanning mode based on the closed region extracted by the inside region information extractor.

The first distance may be smaller than the second distance.

For scanning the photo-setting resin with the radiation beam, the scanned set layer is scanned based on the extracted contour line information and also scanned based on the extracted closed region. Particularly, the scanned set region is scanned in the vector scanning mode along the contour line, and in the raster scanning mode inwardly of the contour line.

The vector scanning mode may be carried out before the raster scanning mode, or vice versa. In the vector scanning mode, the radiation beam is scanned along the line that is spaced the first distance (r1) inwardly from the contour line. In the raster scanning mode, the radiation beam is scanned inwardly of the line that is spaced the second distance (r2) inwardly from the contour line.

More specifically, the optical scanner means generates a radiation beam including a wavelength suitable for photo-setting the photo-setting resin solution, and applies the radiation beam to scan the photo-setting resin solution stored in the tank. When the scanning of the photo-setting resin solution in one isometric section is over, a scanned set layer of photo-setting resin produced by exposure to the radiation beam is lowered by the elevator means. Then, the above process is repeated to generate a stack of successive scanned set layers.

First, information relative to a scanned set layer to be formed by applying and scanning the radiation beam without moving the elevator means is extracted from the three-dimensional shape information memory by the scanned set layer information extractor.

Based on the scanned set layer information produced by the scanned set layer information extractor, the contour line detector detects the contour line of the scanned set layer, and the contour set information extractor calculates the line spaced the first distance (r1) inwardly from the contour line as path information.

The path information is outputted to the optical scanner means, and the vector scanning mode is carried out along the contour line. Since the radiation beam moves along the contour line, the scanned set layer is shaped highly accurately along the contour line without having to reduce the spot diameter of the radiation beam and the scanning pitch.

The inside region information extractor extracts information relative to the closed region that is spaced the second distance (r2) inwardly from the contour line detected by the contour line detector. The extracted information is outputted to the optical scanner means. As a result, the raster scanning mode is carried out in the closed region enclosed by the contour line.

If the first distance is smaller than the second distance, then any overlap between a scanned set layer produced by the vector scanning mode along the contour line and a scanned set layer produced by the raster scanning mode is minimized. Therefore, when the photo-setting resin solution is set, it shrinks with a relatively uniform shrinkage factor, and the produced resin model is prevented from being unduly deformed.

As described above, to form a shaped region in an isometric section, the shaped region is set by being scanned with a radiation beam along the contour line of the shaped region, and an inside region inward of the contour line is set by being scanned with the radiation beam in the raster scanning mode. In as much as all the edges of the shaped closed region extend along the direction in which the radiation beam is scanned, the shaped region is formed highly accurately in the isometric region.

If the radiation beam is scanned along the line that is spaced the first distance (r1) inwardly from the contour line in the vector scanning mode to set the shaped region along the contour line, and scanned inwardly of the line that is spaced the second distance (r2) inwardly from the contour line in the raster scanning mode to set the region inwardly of the contour line, then an overlap of the set regions produced by the vector and raster scanning modes is minimized, preventing the resin model from being unduly deformed due to shrinkage upon being set.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 10 a side elevational view illustrative of a final setting step, after scanned set layers are stacked, of a conventional optical shaping process;

DETAILED DESCRIPTION OF THE PREFERRED EMBODIMENTS

Figure 1:
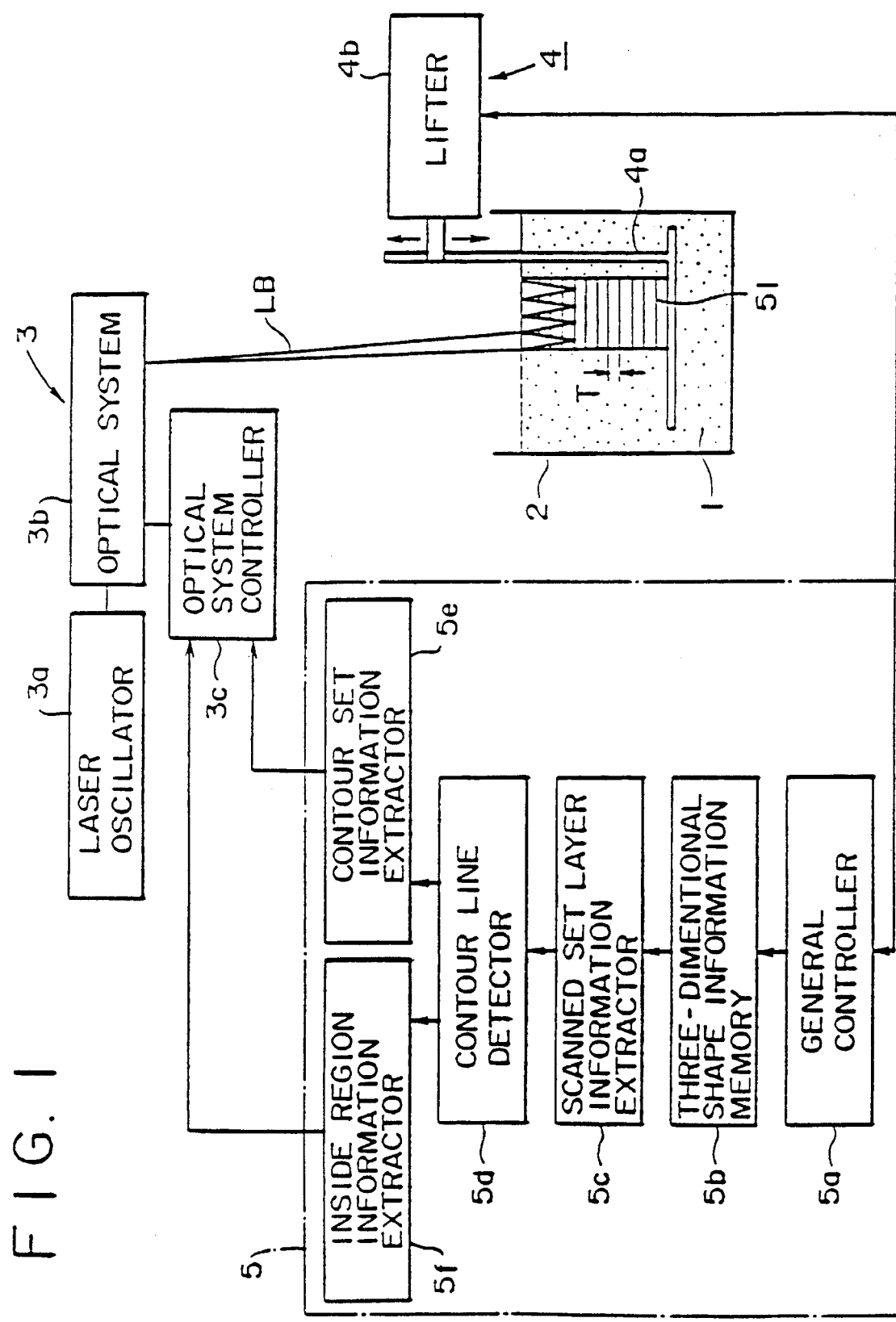
FIG. 1 is a block diagram of an optical shaping apparatus according to the present invention.

As shown in FIG. 1, an optical shaping apparatus according to the present invention includes a tank 2 containing a photo-setting resin solution 1 which can be set due to addition polymerization when exposed to light LB. For example, when exposed to light, a vinyl monomer such as styrene, methyl methacrylate, and vinyl acetate polymerizes even in the absence of a photopolymerization initiator or in the presence of a sensitizer or dye which absorbs ultraviolet radiation.

The photo-setting resin solution 1 that can be employed in the present invention is not limited to any materials, but may be a resin which can be set into a solid state even if it is of a liquid state when not set. The light LB may be an ultraviolet radiation or other light selected depending on the photo-setting resin solution 1.

The tank 2 accommodates therein an elevator 4a having a table for supporting set resin layers thereon, the table being capable of blocking light against transmission therethrough. The elevator 4a can be vertically moved in the tank 2 by a lifter 4b that is positioned outside of the tank 2. The lifter 4b can mechanically elevate and lower the elevator 4a and control the vertical movement of the elevator 4a. The elevator 4a and the lifter 4b jointly serve as an elevator system 4. The lifter 4b is supplied with a command signal from a general controller 5a of a control system 5. The general controller 5a supplies a command signal to the lifter 4b based on information supplied to or from an optical scanning system 3.

For example, when the general controller 5a detects the completion of scanning over one isometric section based on information supplied from the optical scanning system 3, the general controller 5a applies a command signal to the lifter 4b to cause the lifter 4b to lower the elevator 4a a distance or pitch that is equal to the thickness T of a scanned set layer that has been formed in the isometric section.

The optical scanning system 3 comprises a laser oscillator 3a for generating a laser beam such as an ultraviolet laser beam, an optical system 3b for scanning the laser beam generated by the laser oscillator 3a over the surface of the photo-setting resin solution 1 in a predetermined scanning pattern, and an optical system controller 3c for controlling the optical system 3b. The optical system 3b includes a shutter (AOM) for selectively passing and blocking the laser beam, and a voltage applicator and a galvanometric mirror for changing the direction of the laser beam, and can turn on and off the laser beam, vary the intensity or radiation energy of the laser beam, change the path or direction of the laser beam, and control the speed at which the laser beam is scanned. The optical system controller 3c supplies the optical system 3b with a command signal relative to scanning conditions according to the predetermined scanning pattern.

The optical scanning system 3 operates essentially based on basic pattern data that has been supplied in advance to the general controller 5a. Specific scanning conditions supplied from the optical system controller 3c to the optical system 3b may be modified by command signals that are given from the control system 5 to the optical system controller 3c.

The general controller 5a of the control system 5 controls the elevator system 4 and the optical scanning system 3 in a mutually related manner based on previously supplied data depending on a resin model to be formed. The control system 5 includes, in addition to the general controller 5a, a three-dimensional shape information memory 5b, a scanned set layer information extractor 5c, a contour line detector 5d, a contour set information extractor 5e, and an inside region information extractor 5f.

The lifter 4b, the optical system controller 3c, and the control system 5 are shown as separate from each other in FIG. 1 for an easier understanding of their functions. However, the lifter 4b, the optical system controller 3c, and the control system 5 may be combined into an information processing system in so far as it has their functions.

Figure 11:
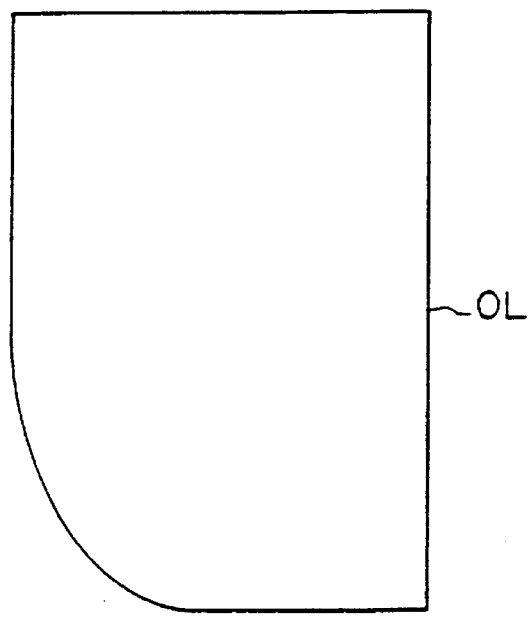
FIG. 11 is a plan view illustrative of a first step of the conventional optical shaping process.

Respective processing sequences of the three-dimensional shape information memory 5b, the scanned set layer information extractor 5c, the contour line detector 5d, the contour set information extractor 5e, and the inside region information extractor 5f will be described below with respect to the formation of a region enclosed by a contour line within an isometric section as shown in FIG. 11 by way of illustrative example.

The three-dimensional shape information memory 5b stores all information relative to the three-dimensional shape of a resin model W to be formed, or at least information relative to the three-dimensional shapes of all isometric sections where shaped regions are enclosed by contour lines.

The scanned set layer information extractor 5c extracts only information relative to a scanned set layer which is a shaped region in one isometric section from the three-dimensional information stored in the three-dimensional shape information memory 5b. Specifically, the general controller 5a distinguishes a set region from an unset region in a certain isometric section for the control of the turning-on and -off of the laser beam in the optical system 3b, and the scanned set layer information extractor 5c selects and read only information relative to such a set region. The information extracted by the scanned set layer information extractor 5c will be used as basic information in the shaping process described below.

The contour line detector 5d reads the information relative to the set region extracted by the scanned set layer information extractor 5c, and recognizes a contour line OL of the set region in the isometric section based on the information thus read.

The contour set information extractor 5e calculates a contour line OLA (see FIG. 2) that is spaced a distance r1 from the contour line OL read by the contour line detector 5d, inwardly within the closed region. The calculated contour line OLA will serve as a central line for vector scanning along the contour line as described later on. The distance r1 should preferably be equal to the radius of the ultraviolet laser beam LB, more strictly, the radius of a circular spot set by the ultraviolet laser beam LB.

The inside region information extractor 5f calculates another contour line OLB (see FIG. 2) that is spaced a distance r2 from the contour line OL inwardly within the closed region. The calculated contour line OLB will serve as a start-of-scan point, an end-of-scan point, or a central line for raster scanning in the closed region as described later on. The distance r2 should preferably be selected such that the contour line OLB is spaced inwardly a distance equal to the radius of the ultraviolet laser beam LB, more strictly, the radius of a circular spot set by the ultraviolet laser beam LB, from the contour line OLA. In this embodiment, the distance r2 is greater than the distance r1.

Figure 3:
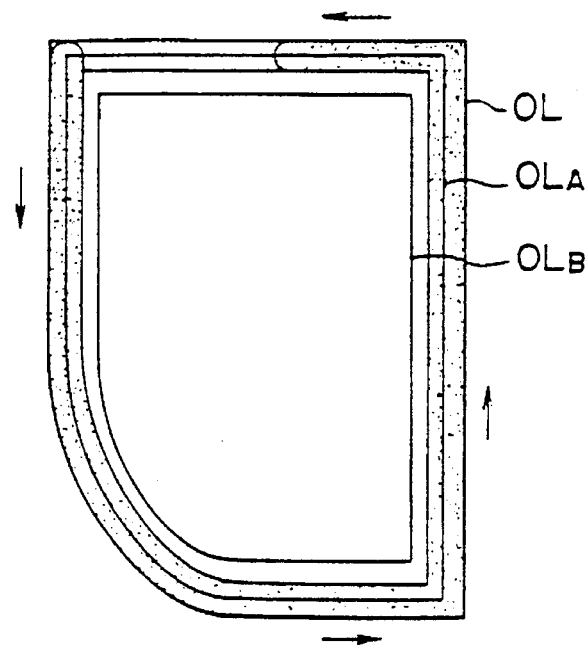
FIG. 3 is a plan view illustrative of a second step of the optical shaping method.

The contour line information produced by the contour set information extractor 5e is outputted to the optical system controller 3c. The ultraviolet laser beam LB is scanned based on the contour line information produced by the contour set information extractor 5e in a vector scanning mode along the contour line OLA. In the vector scanning mode, as shown in FIG. 3, the ultraviolet laser beam LB only traces the contour line OLA, and a start-of-scan point, an end-of-scan point, and a scanning line are not defined for scanning the ultraviolet laser beam LB.

The information relative to the closed region, produced by the inside region information extractor 5f, is also outputted to the optical system controller 3c. The ultraviolet laser beam LB is scanned based on the information produced by the inside region information extractor 5f in a raster scanning mode in one or opposite directions along the contour line OLB.

Figure 2:
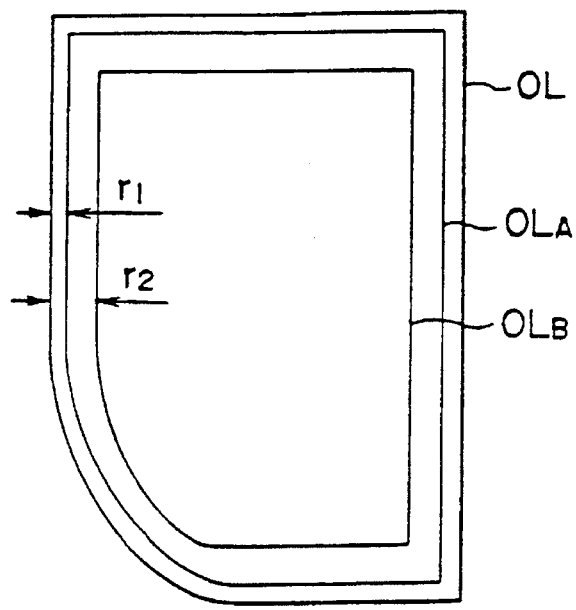
FIG. 2 is a plan view illustrative of a first step of an optical shaping method according to an embodiment of the present invention.
Figure 4:
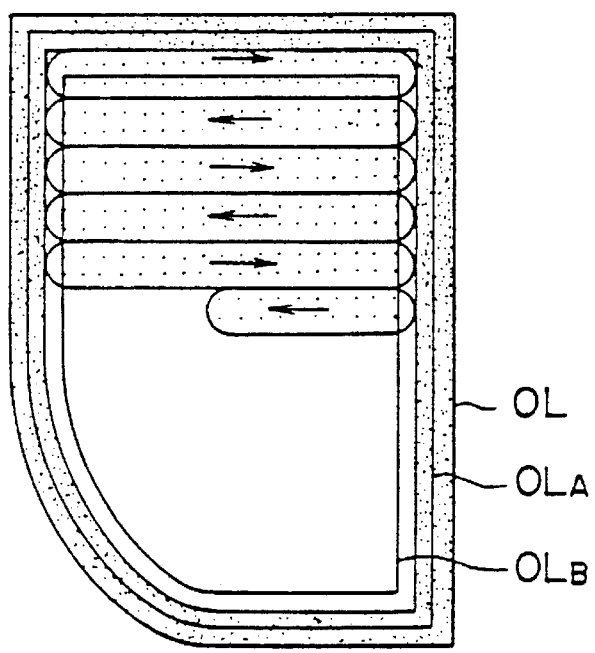
FIG. 4 is a plan view illustrative of a third step of the optical shaping method.
Figure 12:
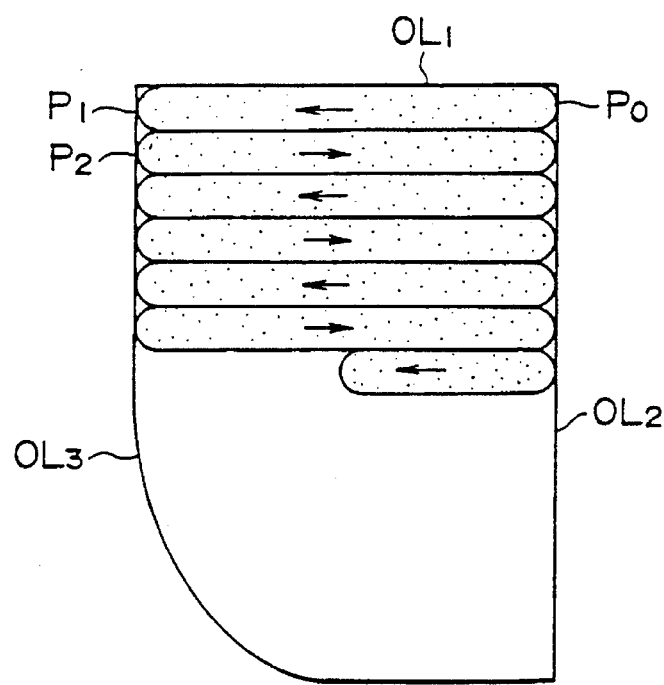
FIG. 12 is a plan view illustrative of a second step of the conventional optical shaping process.

Operation of the optical shaping apparatus will be described below with reference to FIGS. 2 through 5 which are illustrative of an optical shaping method according to an embodiment of the present invention. In the conventional optical shaping process, as shown in FIG. 12, the entire closed region enclosed by a contour line is scanned in the raster scanning mode. According to the present invention, however, the contour line OL is scanned in the vector scanning mode, and the inside region enclosed by the contour line OL is scanned in the raster scanning mode. Specifically, as shown in FIGS. 2 through 4, the central line for the vector scanning mode is the contour line OLA that is spaced or offset the distance r1 inwardly from the contour line OL. Start-of-scan and end-of-scan points for the raster scanning mode are spaced or offset the distance r2 inwardly from the contour line OL.

The optical scanning system 3 generates an ultraviolet laser beam LB including a wavelength suitable for setting the photo-setting resin solution 1, and applies the ultraviolet laser beam LB to scan the photo-setting resin solution 1 in the tank 2. When the scanning of the photo-setting resin solution 1 in one isometric section is over, a scanned set layer 51 of photo-setting resin produced by exposure to the ultraviolet laser beam LB is lowered by the elevator system 4. Then, the above process is repeated to generate a stack of successive scanned set layers 51. The above process of producing a scanned set layer 51 of photo-setting resin will be described in detail below.

Figure 5:
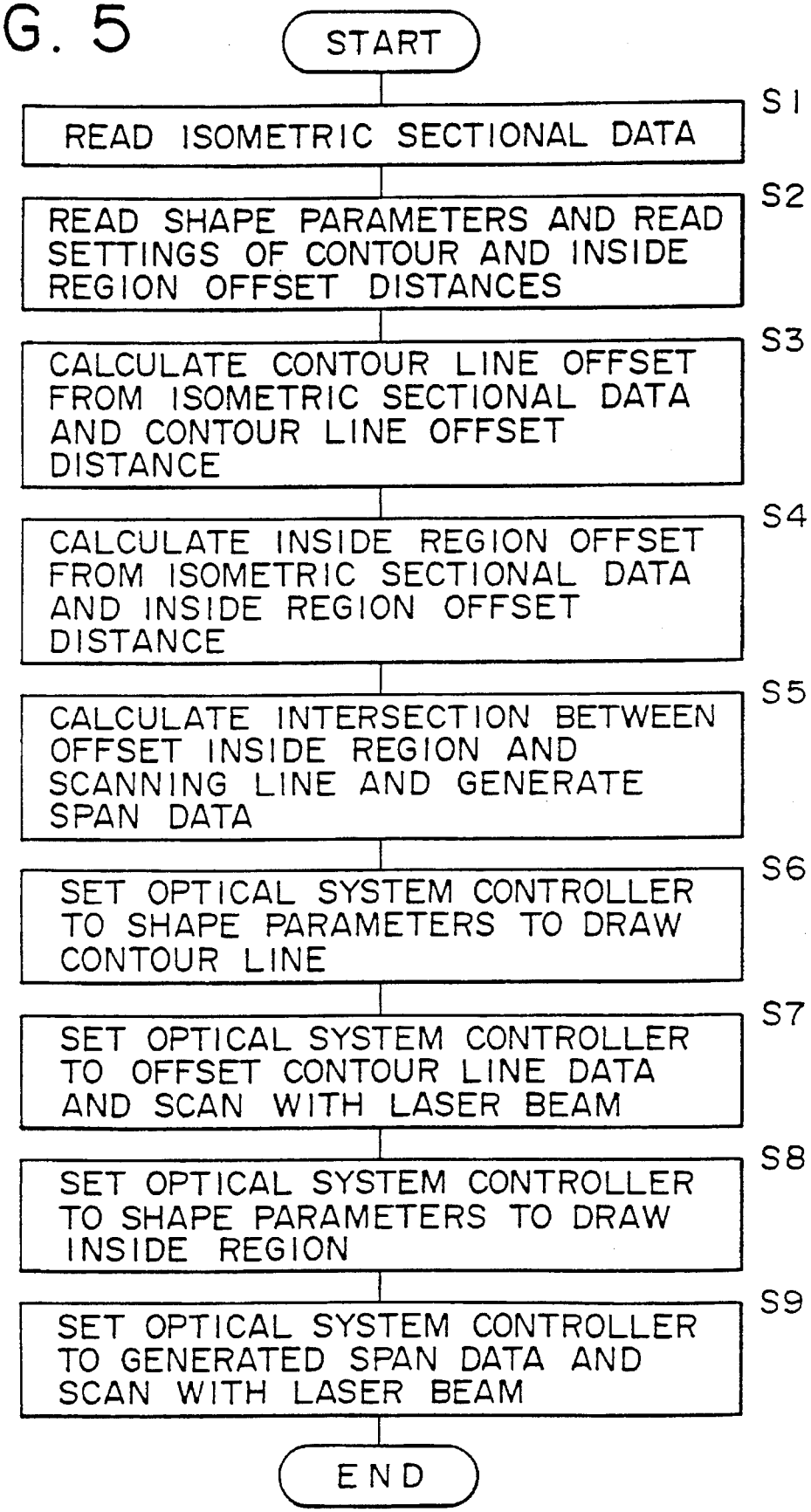
FIG. 5 is a flowchart of an operation sequence of a control system of the optical shaping apparatus.

First, information relative to a scanned set layer 51 to be formed by applying and scanning the ultraviolet laser beam LB without moving the elevator 4a is extracted from the three-dimensional shape information memory 5b by the scanned set layer information extractor 5c in a step S1 (see FIG. 5). At the same time, the scanned set layer information extractor 5c reads offset distances r1, r2 in a step S2.

Based on the scanned set layer information produced by the scanned set layer information extractor 5c, the contour line detector 5d detects the contour line OL of the scanned set layer 51, and the contour set information extractor 5e calculates the contour line OLA spaced the distance r1 inwardly from the contour line OL as path information in a step S3 (see FIG. 2). The path information is outputted to the optical system controller 3c in a step S6, and the vector scanning mode is carried out along the contour line OLA in a step S7 (see FIG. 3). Since the ultraviolet laser beam LB moves along the contour line OL, the scanned set layer is shaped highly accurately along the contour line OL without having to reduce the spot diameter of the ultraviolet laser beam LB and the scanning pitch.

The inside region information extractor 5f extracts information relative to the closed region that is spaced the distance r2 inwardly from the contour line OL detected by the contour line detector 5d in a step S4 (see FIG. 2). Span data are generated by calculating intersection between the closed region and scanning lines in a step S5. The extracted information is outputted to the optical system controller 3c in a step S8. As a result, the raster scanning mode is carried out in the closed region enclosed by the contour line OLB in a step S9 (see FIG. 4).

Since the distance r1 is smaller than the distance r2, any overlap between a scanned set layer produced by the vector scanning mode along the contour line and a scanned set layer produced by the raster scanning mode is minimized. Therefore, when the photo-setting resin solution is set, it shrinks with a relatively uniform shrinkage factor, and the produced resin model is prevented from being unduly deformed.

If a photo-setting resin solution whose volume shrinkage factor is small at the time it is set upon exposure to ultraviolet radiation is used, then it is possible to omit an offset contour line for use in the raster scanning mode in a closed region inward of the contour line, as shown in FIGS. 6 through 9 which illustrate an optical shaping method according to another embodiment of the present invention.

In this embodiment, the central line for the vector scanning mode is a contour line OLA that is spaced or offset a distance r1 inwardly from the contour line OL, and start-of-scan and end-of-scan points for the raster scanning mode are defined in relation to the contour line OLA.

Figure 6:
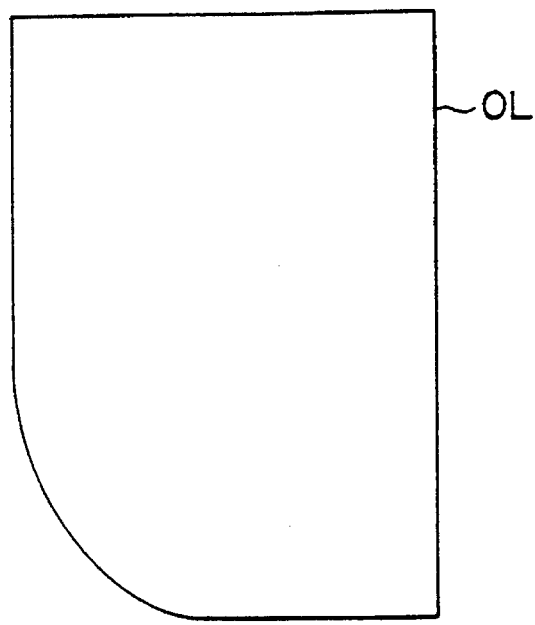
FIG. 6 is a plan view illustrative of a first step of an optical shaping method according to another embodiment of the present invention.

In the optical shaping method according to the embodiment shown in FIGS. 6 through 9, information relative to a scanned set layer 51 to be formed by applying and scanning the ultraviolet laser beam LB without moving the elevator 4a is extracted from the three-dimensional shape information memory 5b by the scanned set layer information extractor 5c (see FIG. 6). At the same time, the scanned set layer information extractor 5c reads an offset distance r1.

Figure 7:
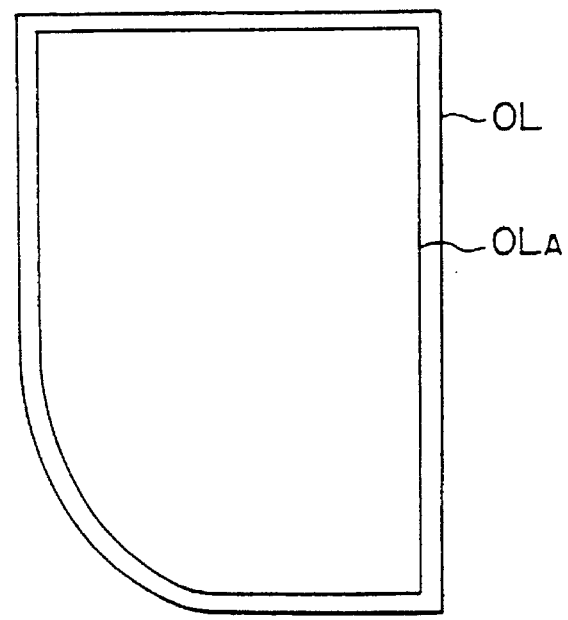
FIG. 7 is a plan view illustrative of a second step of the optical shaping method according to the other embodiment.
Figure 8:
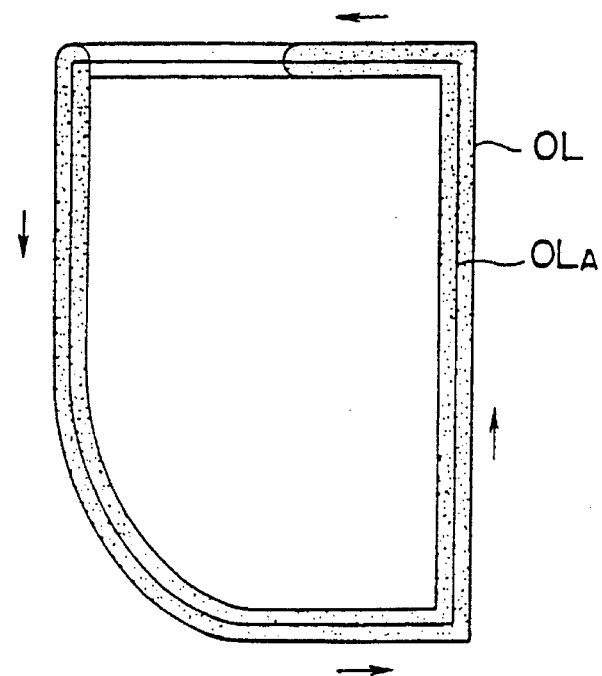
FIG. 8 is a plan view illustrative of a third step of the optical shaping method according to the other embodiment.

Based on the scanned set layer information produced by the scanned set layer information extractor 5c, the contour line detector 5d detects the contour line OL of the scanned set layer 51, and the contour set information extractor 5e calculates the contour line OLA spaced the distance r1 from the contour line OL as path information (see FIG. 7). The path information is outputted to the optical system controller 3c, and the vector scanning mode is carried out along the contour line OLA in the same manner as with the preceding embodiment (see FIG. 8). Since the ultraviolet laser beam LB moves along the contour line OL, the scanned set layer is shaped highly accurately along the contour line OL without having to reduce the spot diameter of the ultraviolet laser beam LB and the scanning pitch.

Figure 9:
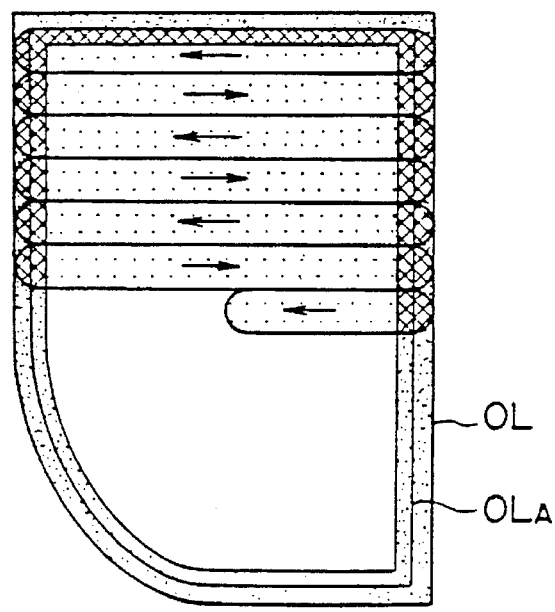
FIG. 9 is a plan view illustrative of a fourth step of the optical shaping method according to the other embodiment.

Using the path information produced by the contour set information extractor 5e, the raster scanning mode is carried out in the closed region enclosed by the contour line OLA (see FIG. 9). A scanned set layer produced by the vector scanning mode along the contour line and a scanned set layer produced by the raster scanning mode partly overlap each other. If the shrinkage factor of the photo-setting resin is small, then any deformation of the produced resin model upon being set is not problematic, and hence the time required to calculate the contour line OLA is reduced.

The offset distances r1, r2 from the contour line OL are not limited to the magnitudes in the illustrated embodiments, and the contour lines OLA, OLB may be offset by distances which vary in different positions.

It is to be understood that the above-described embodiments are merely illustrative of the principles of the invention. Various modifications and changes may be made thereto by those skilled in the art which will embody the principles of the invention and the fall within the spirit and scope thereof.

What we claim is:

1. An apparatus for optically shaping a photo-setting resin into a three-dimensional resin model, comprising:

a tank containing a photo-setting resin solution;

optical scanner means for generating and scanning a radiation beam including a wavelength suitable for photo-setting said photo-setting resin solution over the photo-setting resin solution to produce a scanned set layer therein;

elevator means for vertically moving the scanned set layer produced when said photo-setting resin solution is scanned by said radiation beam; and control means for controlling said optical scanner means and said elevator means;

said control means comprising:

a three-dimensional shape information memory for storing at least part of three-dimensional shape information of the three-dimensional resin model to be formed;

a scanned set layer information extractor for extracting information relative to a scanned set layer which is to be formed by the radiation beam without actuating said elevator means, from the three-dimensional shape information stored in said three-dimensional shape information memory;

a contour line detector for detecting a contour line of the scanned set region based on the information extracted by said scanned set layer information extractor;

a contour set information extractor for calculating, as path information a line which is spaced a first distance inwardly from said contour line detected by said contour line detector;

an inside region information extractor for extracting a closed region inwardly of a line which is spaced a second distance inwardly from said contour line detected by said contour line detector; and means for controlling said optical scanner means to scan the scanned set layer with the radiation beam based on the path information calculated by said contour set information extractor and the closed region extracted by said inside region information extractor.

2. An apparatus according to claim 1, wherein said control means comprises means for controlling said optical scanner means to scan the scanned set layer with the radiation beam in a vector scanning mode based on the path information calculated by said contour set information extractor and in a raster scanning mode based on the closed region extracted by said inside region information extractor.

3. An apparatus according to claim 1, wherein said first distance is smaller than said second distance.

* * * * *